Feb. 16, 1937.                B. W. BENBOW                 2,070,777
                             GEAR MECHANISM
                           Filed Nov. 26, 1935
FIG_1_
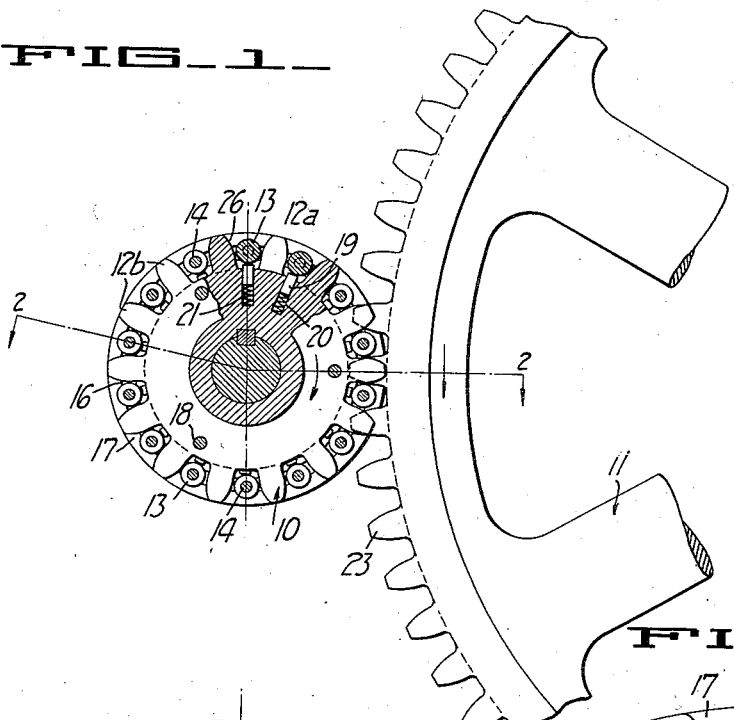
FIG_3_
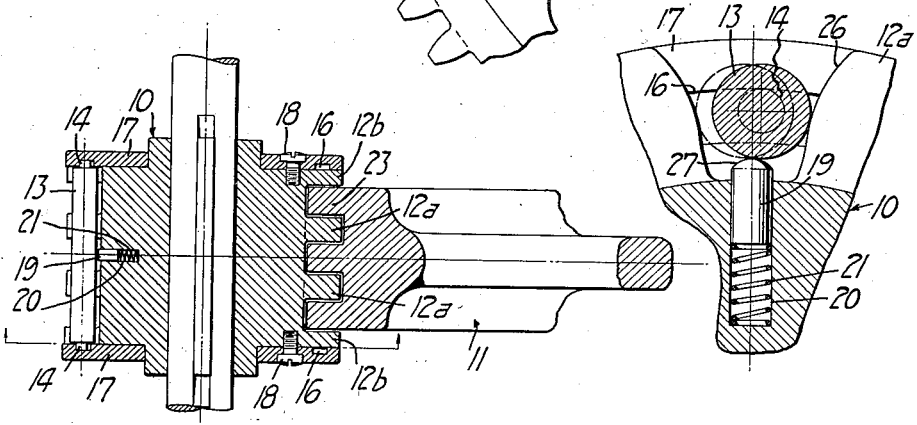
FIG_2_
INVENTOR.
Burtis W. Benbow
BY
Paul D. Flehr
ATTORNEY.

Patented Feb. 16, 1937

2,070,777

UNITED STATES PATENT OFFICE 2,070,777

GEAR MECHANISM

Burtis W. Benbow, Benbow, Calif.

Application November 26, 1935, Serial No. 51,615

6 Claims. (Cl. 74—415)

This invention relates generally to gear mechanisms such as are utilized on many mechanical appliances, for transmission of power.

It is an object of the invention to provide a gear mechanism capable of operating with a minimum amount of frictional loss. In this connection the invention is characterized by the use of rolling contact between torque transmitting elements, as distinguished from sliding contact between gear teeth of standard design.

It is a further object of the invention to provide a gear mechanism capable of heavy duty service with a minimum amount of destructive wear, and which will not require careful lubrication.

Additional objects of the invention will appear from the following description in which the preferred embodiment of the invention has been set forth in detail in conjunction with the accompanying drawing.

Referring to the drawing:

Fig. 1 is a side elevational view, partly in cross section, showing a pinion cooperating with a gear wheel, and incorporating the present invention.

Fig. 2 is a cross sectional detail, taken along the line 2—2 of Fig. 1.

Fig. 3 is an enlarged cross sectional detail, showing the position assumed by each roller, when transmitting power in one direction.

In general my invention utilizes gears having generated teeth, as for example teeth formed according to either the epicycloidal or involute systems. Instead of having the teeth of the two gears directly mesh, as is at present standard practice, spaced annular rows of teeth on one gear operate between the spaced annular rows of the teeth on the other gear. One gear carries a plurality of rollers which the teeth of the other gear engage, and which transmit torque between the gears by rolling contact with the faces of the teeth.

Referring to the drawing, one gear is represented by the drive pinion 10, while the second gear is represented by the driven gear wheel 11. The periphery of the pinion 10 is provided with gear teeth 12a and 12b, which in this instance have surfaces shaped in accordance with the epicycloidal system. It will be noted that the teeth are divided into a plurality of annular rows, the two outer rows being formed by the teeth 12b, and the inner rows by the teeth 12a. The teeth of each row are in direct alignment with respect to the axis of the pinion.

Disposed between the teeth of the pinion, are the rollers 13, which can be made of suitable material, such as hardened steel. In order to form means for loosely retaining these rollers in assembled relationship with respect to the body of the pinion, each of the rollers is shown provided with end extension studs 14. These studs are loosely accommodated in annular grooves 16, which are formed in the inner faces of the end plates 17. The end plates are in turn clamped upon the body of the pinion by suitable means, such as the retention screws 18.

For a purpose which will be presently explained, it is desirable to have the rollers 13 yieldably urged outwardly to their limiting positions, substantially as illustrated in Figs. 1 and 2. A convenient means for this purpose is to provide a small pin or plunger 19, beneath the medial portion of each roller, and which is slidably fitted within a bore 20 formed in the body of the pinion. A compression spring 21, associated with each pin 19, causes each pin to press outwardly upon its associated roller, to cause the roller to assume its normal limiting position. It may be explained at this point that when all of the rollers 13 are in their outer limiting positions, it is desirable to have their axes coincide with a circle which is slightly larger than the pitch circle of the pinion teeth. The inner limiting position of each roller brings the roller axis slightly within the pitch circle of the pinion. Thus each roller is capable of limited movement beyond and within the pitch circle.

The gear wheel 11 is provided with gear teeth 23, which can have the same contour as the teeth for the pinion. For the type of pinion illustrated in the drawing, the teeth on the gear wheel are divided into three spaced annular rows which are interposed between the rows of teeth on the pinion. When the gear wheel is properly mounted with respect to the pinion, the distance between the two axes of rotation is equal to the pitch radius of the pinion plus the pitch radius of the gear wheel.

It will be noted from Fig. 1 that the portions of the rollers extending between the rows of teeth on the pinions, mate with the teeth formed on the gear wheel. Assuming that the pinion as illustrated in Fig. 1 is being driven in a clockwise direction, with counterclockwise rotation of the driven gear wheel, as one of the rollers mates between two teeth on the gear wheel, the tooth faces 24 contact with the roller, whereby diametrically opposite surface portions of the roller are pressed against the tooth faces 26 of the pinion teeth. Further rotation of the pinion, until that particular roller is brought into a position coincident with the line of centers between the gear and the pinion, causes the roller to rotate in a clockwise direction, over the tooth faces with which it is in contact, and at the same time the roller necessarily moves inwardly a slight amount, towards the axis of rotation of the pinion. Movement of this particular roller past the line of centers, is accompanied by rotation of the roller in a counterclockwise direction, and by outward movement of the roller, until the roller again assumes its outer limiting position. Thus it is apparent that there is no sliding action between the gear teeth, and no sliding action between the gear teeth and the rollers. All pressure or torque transmitted between the gear and the pinion occurs through the rollers, and is accompanied only by rolling action of the rollers upon the tooth faces. The contour of the teeth is utilized, in that properly generated surfaces are provided over which the surfaces of the rollers operate.

With gear teeth formed in accordance with the epicycloidal system, some clearance must be afforded between the rollers and the adjacent faces of the pinion teeth, so that these rollers may roll in and out as they engage the teeth of the gear wheel. With teeth formed in accordance with the involute system, less clearance can be afforded between the rollers and the teeth of the pinion.

When transmitting power with rotation of the pinion in one direction, the clearance referred to above causes relatively little noise. This is because each roller tends to remain in contact with the tooth faces adjacent one side of the same. Thus as shown in Fig. 3, the outer ends of the pins 19 are rounded, as indicated at 27, so that when the associated roller has been shifted to one side, in contact with the tooth faces 26, it remains in such position, by virtue of the camming action of the rounded end of pin 19. If the direction of drive is reversed, then each roller will assume and remain in the position illustrated in dotted lines in Fig. 3.

Because of the absence of sliding contact, and with utilization of rolling contact to transmit power between the gear teeth, it is evident that my mechanism is characterized by a minimum amount of frictional loss. Furthermore wear is reduced to a minimum, even though relatively heavy loads may be transmitted. The rolling action does not require careful lubrication, and in fact my mechanism can operate over relatively long periods of time, without lubrication of any kind. Thus the invention is ideally suited for heavy duty services, where gears are subjected to severe usage with only casual lubrication.

I claim:

1. In a gear mechanism, a drive gear having its periphery provided with gear teeth, a driven gear likewise having its periphery provided with gear teeth, said gears being adapted to rotate about parallel axes spaced apart a distance substantially equal to the sum of their respective pitch radii, the teeth on the gears being arranged in annular rows whereby one row of teeth on one gear is disposed to operate between two rows of teeth on the other gear, and rollers loosely carried by one of the gears between the teeth thereof, said rollers serving to transmit torque between the teeth of the two gears by rolling contact with the side faces of the teeth and extending between the two annular rows of teeth on said other gear.

2. In a gear mechanism, a drive gear having its periphery provided with gear teeth, a driven gear likewise having its periphery provided with gear teeth, said gears being adapted to rotate about parallel axes spaced apart a distance substantially equal to the sum of their respective fixed radii, the teeth on the gears being arranged in annular rows whereby one row of teeth on one gear is disposed to operate between two rows of teeth on the other gear, without direct engagement between said teeth, and rollers loosely carried by one of the gears between the teeth thereof, said rollers extending substantially parallel to said axes and between two rows of said teeth, said rollers serving to transmit torque between the teeth of the two gears by rolling contact with the side faces of the teeth.

3. In a gear mechanism, a pinion having two spaced annular rows of gear teeth on its periphery, rollers carried between said gear teeth and spanning the space between the two rows of teeth, means for loosely retaining the rollers in assembled relationship with respect to the pinion, with the axis of the roller extending substantially parallel to the axis of the pinion, and spring means for normally urging said rollers outwardly to limiting positions in which their axes are substantially coincident with a circle slightly larger in diameter than the pitch circle of the gear teeth.

4. In a gear mechanism, a pinion having two spaced annular rows of gear teeth on its periphery, rollers carried between said gear teeth and spanning the space between the two rows of teeth, means for loosely retaining the rollers in assembled relationship with respect to the pinion, with the axis of said rollers extending substantially parallel to the axis of the pinion, spring means for normally urging said rollers outwardly to limiting positions in which their axes are substantially coincident with a circle slightly larger in diameter than the pitch circle of the gear teeth, and a gear having an annular row of teeth adapted to engage those portions of said rollers extending between said two annular rows of teeth on the pinion.

5. In a gear mechanism, a pinion having two spaced annular rows of teeth on its periphery, the individual axes of the teeth in the two rows being in alignment and parallel to the axis of the pinion, rollers carried between said gear teeth and spanning the space between the two rows, and means for loosely retaining said rollers in assembled relationship with said pinion, with the individual axes of the rollers substantially parallel to the axis of the pinion and substantially midway between the individual axes of the teeth.

6. In a gear mechanism, a drive gear having its periphery provided with gear teeth, a driven gear likewise having its periphery provided with gear teeth, said gears being adapted to rotate about parallel axes spaced apart a distance substantially equal to the sum of their respective radii, the teeth on the gears being arranged in annular rows whereby one row of teeth on one gear is disposed to operate between two rows of teeth on the other gear, the individual teeth of the two rows on the other gear having their axes in alignment with respect to each other and also in alignment with the teeth of said one row in the meeting zone between the two gears, and rollers loosely carried by one of the gears between the teeth thereof, said rollers serving to transmit torque between the teeth of the two gears by rolling contact with the side faces of the teeth, said rollers extending between the two annular rows of teeth on said other gear.

BURTIS W. BENBOW.